US00H002107H1

(19) United States
(12) Statutory Invention Registration
Richter

(10) Reg. No.: US H2107 H
(43) Published: Jul. 6, 2004

(54) BLIND CAPTIVE MOUNTING STUD AND MOUNTING SPACER

(75) Inventor: Melvin W. Richter, Kingsville, MD (US)

(73) Assignee: The United States of America as represented by the Secretary of the Air Force, Washington, DC (US)

(21) Appl. No.: 10/185,744

(22) Filed: Jun. 27, 2002

(51) Int. Cl.[7] ..... F16C 11/00
(52) U.S. Cl. ..... 403/408.1
(58) Field of Search ..... 403/408.1; 248/922, 248/923, 919; 411/84, 85, 402, 409

(56) References Cited

U.S. PATENT DOCUMENTS 3,321,165 A * 5/1967 Wann ..... 248/922
4,579,473 A * 4/1986 Brugger ..... 248/922
4,621,782 A * 11/1986 Carlson et al. ..... 248/923
6,280,116 B1 * 8/2001 Szu ..... 403/408.1

* cited by examiner

*Primary Examiner*—Daniel T. Pihulic
(74) *Attorney, Agent, or Firm*—William G. Auton

(57) ABSTRACT

In pursuit of developing a means for mounting a pedestal mounted CRT in a rack mounted application in a test console, it was necessary to develop a compact means of securing the CRT plastic envelope to a perforated slidable shelf in the test console. Since the vertical space was critical, it was determined that the swivel base could be discarded and replaced by a unique "Blind Capture Mounting Stud" and a "Mounting Spacer".

1 Claim, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

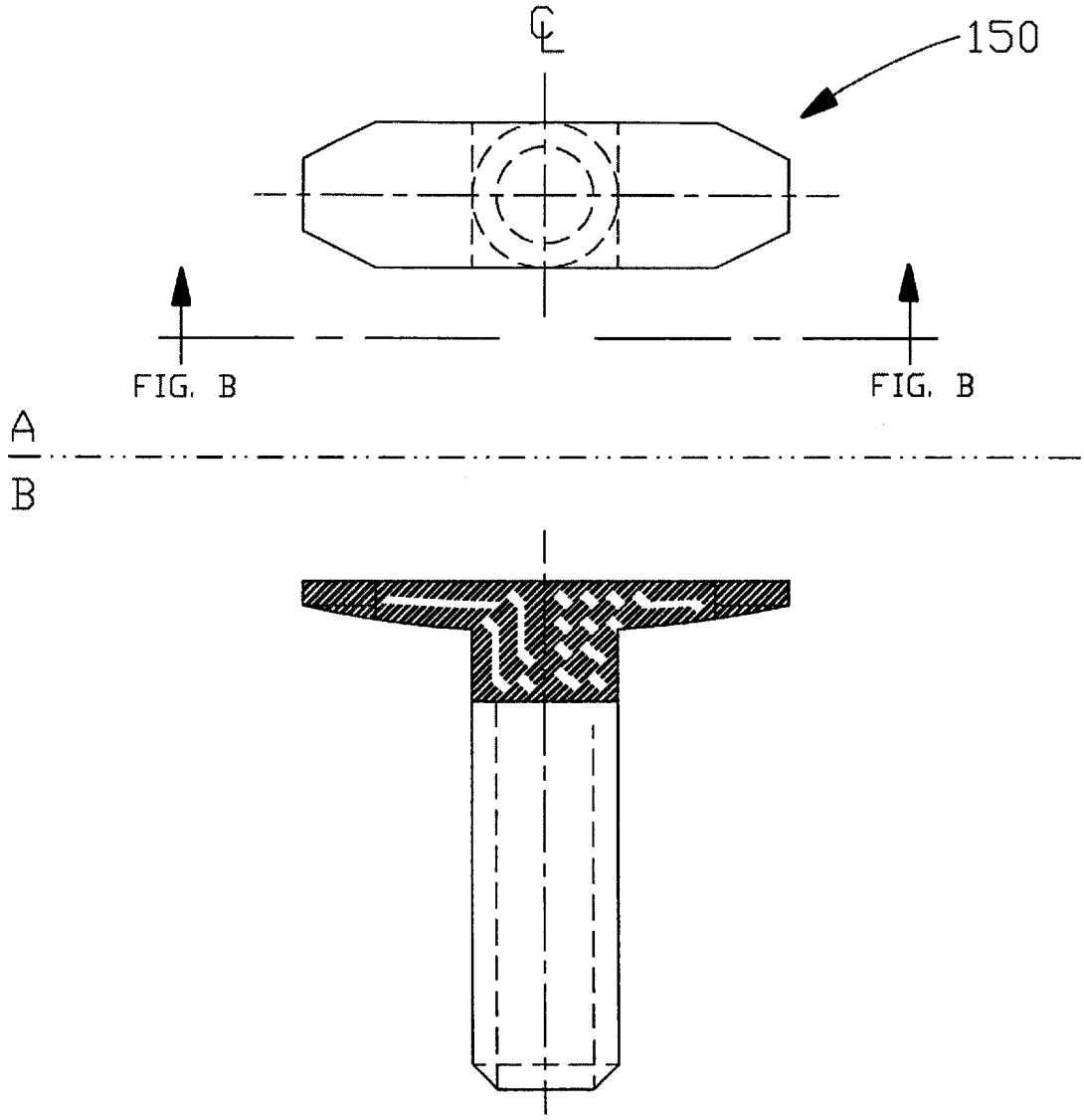
FIG. 2 A-B

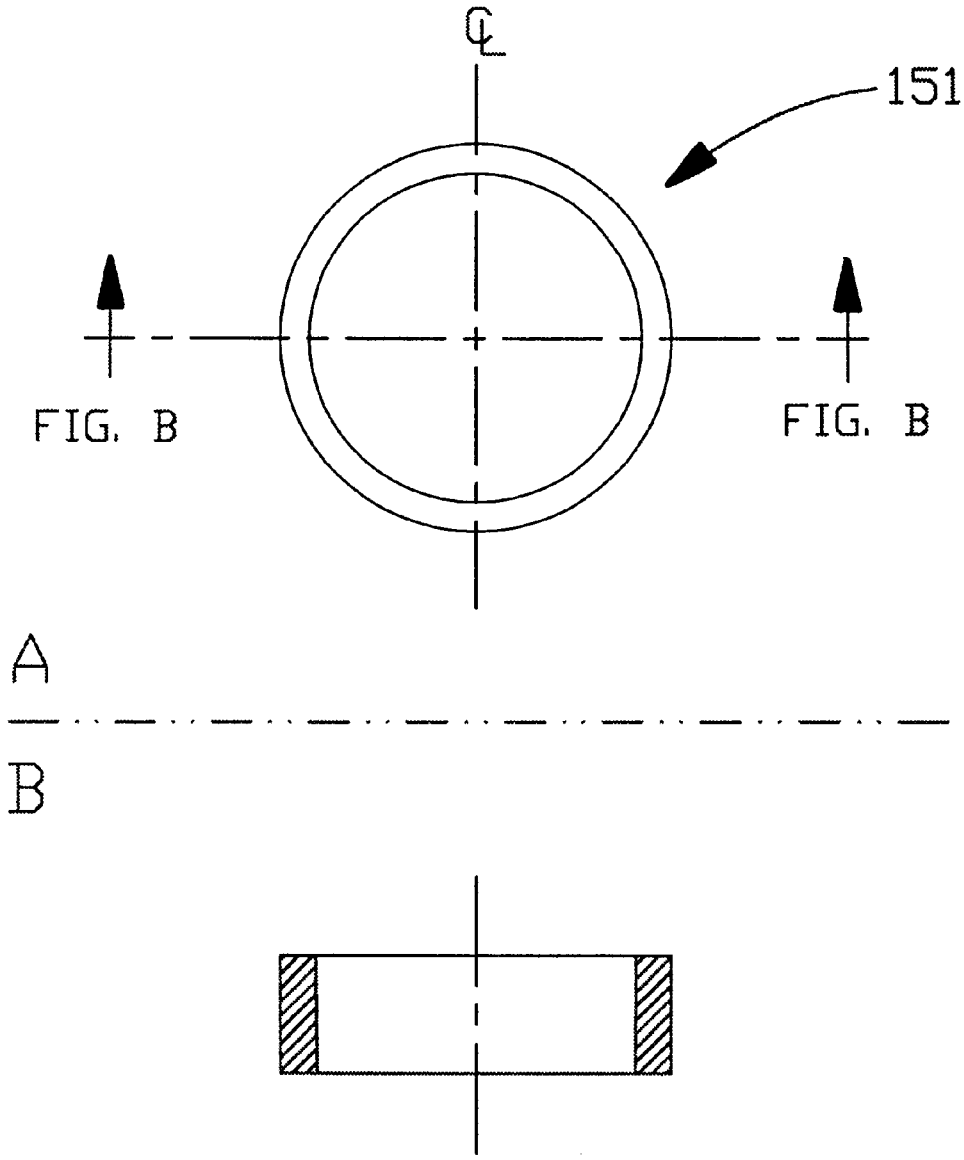
FIG. 3 A-B

BLIND CAPTIVE MOUNTING STUD AND MOUNTING SPACER

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to mechanical brackets and more specifically to a means for mounting a pedestal mounted CRT in a rack mounted application in a test console.

In pursuit of developing a means for mounting a pedestal mounted CRT in a rack mounted application in a test console, it was necessary to develop a compact means of mounting the CRT plastic envelope to a perforated slidable shelf in the test console. Since the vertical space was critical, it was determined that the swivel pedestal could be discarded and replaced by a unique "Blind Captive Mounting Stud" and a "Mounting Spacer".

The task of mounting a CRT in a test console is alleviated to some extent, by the systems disclosed in the following U.S. patents, the disclosures of which are incorporated herein by reference:

U.S. Pat. No. 4,964,606, Oct. 23, 1990, Overhead mount for a CRT Beam, Don, E.;

U.S. Pat. No. 5,702,280, Dec. 30, 1997, Color selecting electrode mounting frame for CRT and process for production of same, Horiuchi, Yoshiro;

U.S. Pat. No. 5,532,546, Jul. 2, 1996, Color selecting electrode mounting frame for CRT and process for production of same, Horiuchi, Yoshiro;

U.S. Pat. No. 6,124,552, Sep. 26, 2000, Motherboard screwless mounting spacer, Boe, Craig;

U.S. Pat. No. 6,123,301, Sep. 26, 2000, Horizontal-mount bracket system for holding and locking sensor position, Schroeder, Thaddeus;

U.S. Pat. No. 6,123,143, Sep. 26, 2000, Heat exchanger combination mounting bracket and inlet/outlet block with locking sleeve, Insalaco, Jeffrey Lee;

U.S. Pat. No. 6,121,528, Sep. 19, 2000, Electroacoustically amplified drum and mounting bracket, May, Randall L.;

U.S. Pat. No. 6,116,566, Sep. 12, 2000, Processor support bracket with snap mounting feature, Brown, Joseph W.;

U.S. Pat. No. 6,109,461, Aug. 29, 2000, Shelf mounting system including mounting brackets having mounting ears for mounting vertical track members to a wall, Kluge, Richard G.

A prior art approach involving an enclosure for a portion of the cathode ray tube is disclosed in U.S. Pat. No. 2,354,661 which also employs a resilient mount at the center of gravity of the tube to which the tube is threadedly secured. Such an arrangement is complex and requires a special tube construction, thereby increasing cost, as opposed to the efficient mounting arrangement of the present invention.

Apart from this prior art arrangement, the use of a resilient mount for a cathode ray tube is well known in the prior art, such as disclosed in U.S. Pat. Nos. 2,440,260; 2,165,779; 2,451,832 and 2,047,020, although none of these prior art arrangements is believed to be as efficient as the present invention for a pedestal mount where conservation of vertical space is a necessity.

In addition, although vibration mounting of vacuum tubes per se, such as disclosed in U.S. Pat. Nos. 2,599,003; 2,428,928; 2,453,003; 2,119,102; 3,308,521; and 3,265,919, none of the prior art known to the applicant is believed to provide an efficient, cost-efficient approach for a pedestal mount where conservation of vertical space is a necessity.

SUMMARY OF THE INVENTION

The present invention is a system for mounting a CRT display above a shelf. The shelf has an oriface above which the CRT display is to be mounted. One embodiment of the invention includes: a "T" shaped mounting stud which is shaped like a capital letter T and having a top fixed to the CRT display's underside, the "T" shaped mounting stud having a vertical shaft mounted in the oriface of the shelf; and an annular mounting spacer that encircles the "T" shaped mounting stud and which holds up the CRT display above the shelf.

It is an object of the invention to facilitate quick installation of a CRT display that conserves vertical space. These and many other objects and advantages of the present invention will be readily apparent to one skilled in the pertinent art from the following detailed description of a preferred embodiment of the invention and related drawings.

DESCRIPTION OF THE DRAWINGS

FIGS. 2A and 2B are two views of the "T" shaped mounting stud of FIG. 1.

FIGS. 3A and 3B are views of the mounting spacer and annular ring of FIG. 1.

DESCRIPTION OF THE PREFERRED EMBODIMENT

Figure 1:
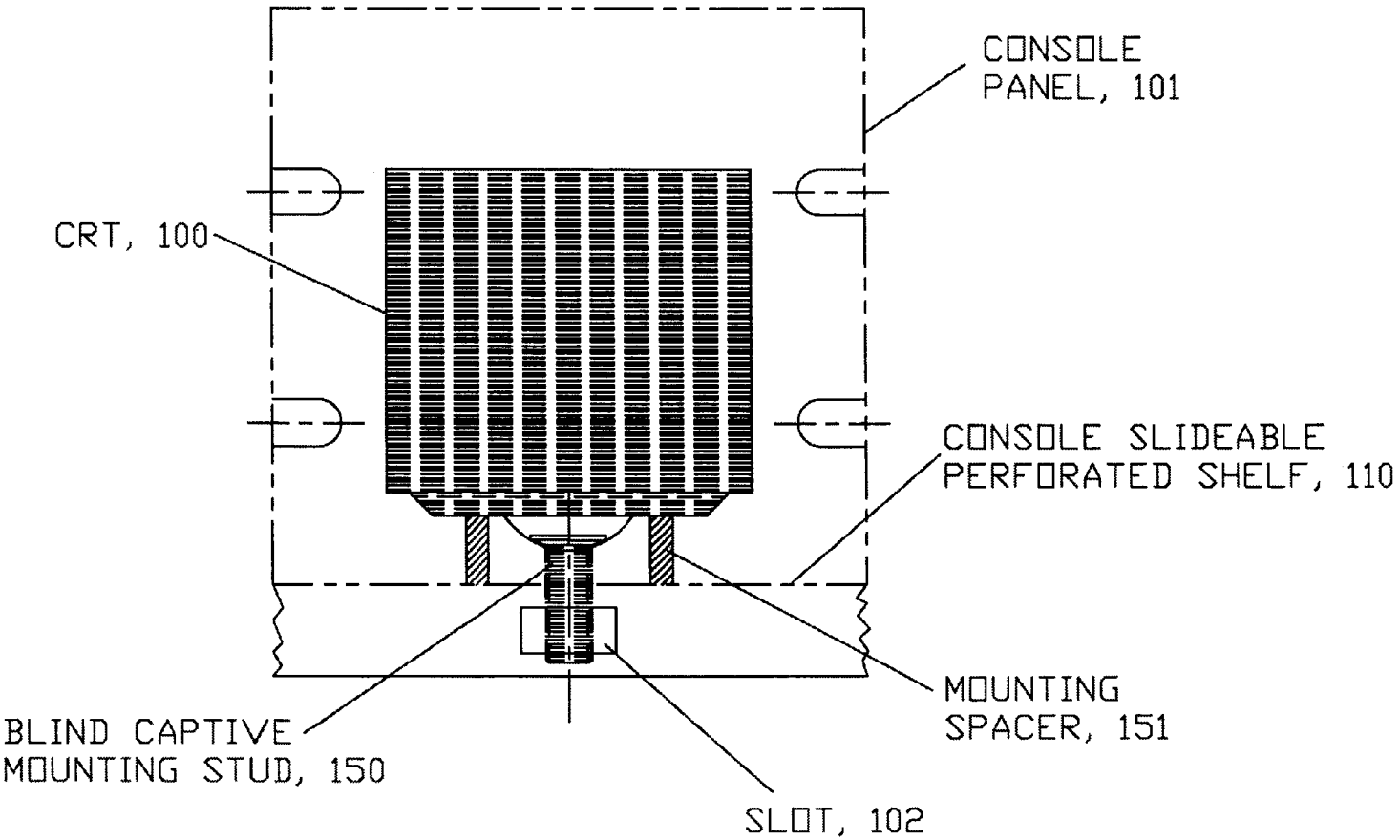
FIG. 1 is a side view of the present invention.

The present invention is a blind captive mounting stud for swivel mount installation of a CRT in a test console. This replaces the swivel pedestal and conserves vertical space, as discussed below.

The reader's attention is now directed towards FIG. 1, which is a side view of the present invention. FIG. 1 shows how a CRT 100, is mounted onto a console shelf 110, with a mounting stud 150, and mounting spacer 151. The mounting stud, 150, as shown in FIGS. 2A and 2B, is T-shaped fixture whose top is affixed to the bottom of the CRT 100 and which fits into a slot 102 in the console shelf 110.

The mounting spacer 151, as shown in FIGS. 3A, & 3B, is an annular ring that fits like a washer around the mounting stud 150 in FIG. 1 and which has a diameter larger that the top "T" of the stud. The mounting spacer 151 also has a height equaling the desired spacing that the CRT 100 is to have above the console sideable perforated shelf, 110 in FIG. 1.

The present invention may also be considered a process that replaces pedestal mounts for CRT displays with a lower mounting stud that conserves vertical space. This process begins by removing the pedestal mount, and installing in place thereof mounting stud that has a predetermined height above the supporting shelf 110 shown in FIG. 1. FIG. 3A is a plan view of the spacer, and FIG. 3B is a side sectional view of the spacer.

The present invention will replace a conventional swivel mount, and allow a CRT to be installed in seconds on a shelf with pivot capability. It presents the benefits listed below in Table 1.

TABLE 1

| Unique Features | Functions | Benefits |
|---|---|---|
| 1. Attaches CRT envelope to a shelf with blind insertion and self locking feature. | 1. The stud head is inserted into a blind hole, rotated, pulled into locking position, the rotation is inhibited. | 1. Facilitates rack mounting of pedestal mounted CRT envelope.<br>2. Allows engagement of the stud without disassembly of CRT envelope.<br>3. Facilitates firm mounting of CRT to a slidable console shelf. |

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A system for mounting a CRT display above a shelf, said shelf having an orifice above with the CRT display is to be mounted, said system comprising a "T" shaped mounting stud having a top fixed to the CRT display's underside, said "T" shaped mounting stud having a vertical shaft mounted in the orifice of the shelf; and an annular mounting spacer that encircles the "T" shaped mounting stud and which holds up the CRT display above the shelf.

* * * * *